(12) United States Patent
Hwang et al.

(10) Patent No.: US 8,509,823 B2
(45) Date of Patent: Aug. 13, 2013

(54) SYSTEM AND METHOD FOR DECORATING SHORT MESSAGE FROM ORIGINATION POINT

(75) Inventors: Sung-Ho Hwang, Gyeonggi-do (KR); Myoung-Gyu Son, Gyeonggi-do (KR); Kyung-Hoon Kim, Gyeonggi-do (KR); Sang-Man Bak, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 1147 days.

(21) Appl. No.: 12/089,011

(22) PCT Filed: Sep. 25, 2006

(86) PCT No.: PCT/KR2006/003797
§ 371 (c)(1),
(2), (4) Date: Apr. 2, 2008

(87) PCT Pub. No.: WO2007/040310
PCT Pub. Date: Apr. 12, 2007

(65) Prior Publication Data
US 2008/0254779 A1    Oct. 16, 2008

(30) Foreign Application Priority Data

Oct. 5, 2005  (KR) .................. 10-2005-0093611
Oct. 5, 2005  (KR) .................. 10-2005-0093613

(51) Int. Cl.
*H04M 3/42* (2006.01)
*H04B 7/216* (2006.01)

(52) U.S. Cl.
USPC .................. 455/466; 370/335; 455/414.4

(58) Field of Classification Search
USPC ........... 455/412.1–414.1, 433; 370/328–351, 370/522; 709/206, 217, 218, 246
See application file for complete search history.

(56) References Cited

U.S. PATENT DOCUMENTS

| | | | | |
|---|---|---|---|---|
| 6,108,325 | A * | 8/2000 | Stephanson et al. | 370/337 |
| 6,141,550 | A * | 10/2000 | Ayabe et al. | 455/433 |
| 7,751,837 | B2 * | 7/2010 | Aaltonen et al. | 455/466 |
| 2002/0126708 | A1 * | 9/2002 | Skog et al. | 370/522 |
| 2002/0132608 | A1 | 9/2002 | Shinohara | |
| 2003/0003935 | A1 * | 1/2003 | Vesikivi et al. | 455/517 |
| 2003/0040300 | A1 * | 2/2003 | Bodic et al. | 455/412 |
| 2003/0054844 | A1 * | 3/2003 | Anvekar et al. | 455/466 |
| 2004/0048627 | A1 * | 3/2004 | Olvera-Hernandez | 455/466 |
| 2005/0186969 | A1 * | 8/2005 | Lohtia | 455/456.3 |
| 2006/0148495 | A1 * | 7/2006 | Wilson | 455/466 |
| 2006/0168004 | A1 * | 7/2006 | Choe et al. | 709/206 |
| 2007/0088801 | A1 * | 4/2007 | Levkovitz et al. | 709/217 |
| 2007/0088851 | A1 * | 4/2007 | Levkovitz et al. | 709/246 |
| 2007/0100942 | A1 * | 5/2007 | Lin et al. | 709/206 |
| 2008/0192736 | A1 * | 8/2008 | Jabri et al. | 370/352 |

FOREIGN PATENT DOCUMENTS

| | | |
|---|---|---|
| KR | 10-2001-0016442 | 3/2001 |
| KR | 10-2002-0011033 | 2/2002 |
| KR | 10-2003-0035249 | 5/2003 |
| KR | 10-2004-0025438 | 3/2004 |

(Continued)

*Primary Examiner* — Kashif Siddiqui
(74) *Attorney, Agent, or Firm* — IP Legal Services, LLC

(57) ABSTRACT

A method for converting a SMS sent through a mobile communication network into a SMS or MMS in a previously registered format includes the steps of: receiving a SMS from a certain sending subscriber, determining whether the corresponding sending subscriber is subscribed to a SMS converting service, then converting the SMS into a previously registered format in case the sending subscriber is subscribed to the SMS converting service, and then sending the converted message to a designated receiving terminal.

27 Claims, 8 Drawing Sheets

(56) References Cited

FOREIGN PATENT DOCUMENTS

| KR | 10-2004-0086963 | 10/2004 |
|---|---|---|
| KR | 10-2004-0091287 | 10/2004 |
| KR | 10-2004-0100700 | 12/2004 |
| KR | 10-2004-0107867 | 12/2004 |
| KR | 10-2005-0029987 | 3/2005 |
| WO | WO 2004/019583 A2 | 3/2004 |
| WO | WO 2005-013629 A1 | 2/2005 |

* cited by examiner

Fig. 4

| Field | Value | Type | Reference | Notes |
|---|---|---|---|---|
| Identifier | WINServiceType(9F FF 40) IMPLICIT Octet String | M | | |
| Length | Variable octets | M | | |
| Contents | | | | |
| H | G | F | E | D | C | B | A | octet | Notes |
|---|---|---|---|---|---|---|---|---|---|
| WIN_Type | | | | WIN_ID | | | | 1 | a |
| MSB | SMS_VAD_Service | | | | | | | 2 | b |
| | | | | | | | LSB | 3 | c |

Fig. 5

| Octet | Bit | VALUE-ADDED SERVICE |
|---|---|---|
| 1st | H | Set 0 |
| | G | Message Manager |
| | F | MESSAGE COORDINATION |
| | E | Deco-SMS |
| | D | Reserved |
| | C | Reserved |
| | B | Reserved |
| | A | Reserved |
| 2~3 | - | Reserved |

Fig. 6

| Octet | Bit | VALUE-ADDED SERVICE |
|---|---|---|
| 1st | H | Set 1 |
| | G | PC Messenger [P3M] |
| | F | Message Manager [SUBSCRIPTION] |
| | E | Message Manager Block(0:deact,act:1) |
| | D | SPAM SMS |
| | C | CHARACTER NUMBER |
| | B | Reserved |
| | A | Reserved |
| 2~3 | - | Reserved |

Fig. 10

| DATA NAME | DATA STRUCTURE | DESCRIPTION |
|---|---|---|
| OriginationServiceIndicator | Octet string (size(1..n)) | Octet 1:<br>87bit: reserved<br>65bit: CISS SERVICE<br>43bit: WOW SERVICE<br>21bit: RCC SERVICE<br>01: INACT<br>10: ACT<br>octet 2~3: SMS indicator |

Fig. 11

| H:bit | SMS VALUE-ADDED SERVICE ATTRIBUTE | Operation |
|---|---|---|
| | SMS SENDING SERVICE ATTRIBUTE | SEND FRO DS-HLR TO SGSN & MSC DURING LOCATION REGISTRATION (SMOT) |
| 0 | SMS RECEIVING SERVICE ATTRIBUTE | RECORD IN Sri_For_SM_ack AND SEND TO DS-SMSC (SMTT) |
| 1 | | |

SYSTEM AND METHOD FOR DECORATING SHORT MESSAGE FROM ORIGINATION POINT

TECHNICAL FIELD

The present invention relates to data transmission in a CDMA (Code Division Multiple Access) network or a WCDMA (Wideband Code Division Multiple Access) network. More particularly, the present invention relates to a message coordination service for decorating a short message by adding text, image, sound and so on to the short message, which is a value-added service for SMS (Short Message Service).

BACKGROUND ART

Along with great development of electronic engineering and communication engineering, a mobile communication terminal is recently provided with various functions. That is, as techniques related to wireless communication and data processing have been rapidly developed, persons may use various functions such as Internet accessing, image communication and moving picture transmission as well as voice call using a mobile communication terminal. In addition, due to rapid propagation of the mobile communication terminals, mobile communication terminals cover a numerous amount of communications among persons, and thus mobile communication terminals become an essential communication means in the present days.

Among various functions of such a mobile communication terminal, SMS (Short Message Service) or voice message service capable of rapidly sending simple information to an opponent is widely used. The SMS allows a person to rapidly and conveniently send desired information to one or many opponent(s) at a very lower cost than a voice call, and also the received text message may be stored for checking it again in the future. Owing to such advantages, the SMS is widely used for providing payment information (price, product details, account information and so on) in an electronic payment service.

An existing SMS just functions to code and send a text. However, users of mobile communication terminals desire to process the content of a message in more various ways. That is to say, there are more needs to enhance decoration of a text message by adding visual or auditory effects such as emoticons, images, moving pictures and sounds, in addition to sending a simple message purpose.

In order to meet such needs of the users, there have been proposed various techniques for converting a short message into a multimedia message by changing a typing style, size or color of SMS or adding images such as avatar, graphic emoticons, moving pictures and sounds thereto.

Korean Laid-open Patent Publication No. 2002-11033 (hereinafter, referred to as '033 patent) discloses a method in which, if a subscriber sends multimedia event index information to a SMS center in a mobile communication network together with a short message, the SMS center determines whether a multimedia event data corresponding to the index exists in a receiving terminal, and then provides the multimedia index information to the receiving terminal together with the short message if it exists in the receiving terminal, so that a multimedia event such as a moving picture and a sound is generated in the receiving terminal.

In addition, Korean Laid-open Patent Publication No. 2004-25438 (hereinafter, referred to as '438 patent) discloses a method for changing a graphic emoticon included in a message into a mapped text when a text message is transmitted, and analyzing a received text message so that a text corresponding to the graphic emoticon is changed into a mapped graphic emoticon and then displayed.

In case of the '033 patent and the '438 patent, it is required to store a separate program or data in a sending/receiving terminal so as to convert a short message into a multimedia message.

Korean Laid-open Patent Publication No. 2004-86963 (hereinafter, referred to as '963 patent) discloses a SMS service method for providing a callback URL (Uniform Resource Locator) capable of downloading an avatar image to a receiving terminal together with a short message.

In addition, Korean Laid-open Patent Publication No. 2001-16442, Korean Laid-open Patent Publication No. 2003-35249 and Korean Laid-open Patent Publication No. 2004-100700 disclose a method in which, if a sending subscriber transmits conversion request information (e.g., special key, conversion command, and text image information) together with a text message data, a text message processing means of the mobile communication network converts the short message into a multimedia message based on the conversion request information of the user and then provides the multimedia message to a receiving terminal.

However, in order to include separate conversion request information in a short message sent to the mobile communication network as mentioned above, a dedicated program should be installed in a sending terminal, or a separate user action for inputting the conversion request information is required.

In addition, for a PCX/MSC (Personal Communication eXchange/Mobile Switching Center) or SMSC (Short Message Service Center) of a mobile communication network to recognize the conversion request information sent from a sending terminal, it is required to change an existing protocol or correct an operating program of the PCX/MSC or the SMSC.

Thus, there is still a need for a short message converting method, which does not request any upgrading of a sending/receiving terminal, additional action of a user, or any change of the mobile communication network.

DISCLOSURE OF INVENTION

Technical Problem

The present invention is directed to providing system and method for converting a short message into a decorated coordination message without any upgrading of a sending/receiving terminal or any separate user action.

Another object of the present invention is to provide system and method for converting a short message into a coordination message without changing any protocol or operating program of MSC or SMSC of a mobile communication network.

Still another object of the present invention is to provide system and method for converting a short message into a coordination message using message parameters of a superior communication protocol such as IS-41-D that regulates function controls among network entities in a CDMA (Code Division Multiple Access) system.

In addition, further another object of the present invention is to provide system and method for converting a short message into a coordination message using message parameters of a superior communication protocol such as IS-637-A that regulates standards for SMS in a WCDMA (Wideband Code Division Multiple Access) system.

Technical Solution

In order to accomplish the above object, in a first aspect of the present invention, there is provided a method for converting a SMS (Short Message Service), sent via a mobile communication network, into a SMS or MMS (Multimedia Message Service) in a previously registered format using a mobile communication that intermediates a SMS or MMS between a sending terminal and a receiving terminal, the method comprising:

(a) receiving a SMS from a sending subscriber;

(b) determining whether the sending subscriber is subscribed to a SMS converting service;

(c) converting the SMS into a previously registered format in case the sending subscriber is subscribed to the SMS converting service; and (d) sending the converted SMS to a receiving terminal.

In a second aspect of the present invention, there is also provided a mobile communication system for converting a SMS, sent from a sending subscriber terminal, into a SMS or MMS in a previously registered format, and then sending the converted SMS or MMS to a receiving subscriber terminal, the system comprising:

means for recording whether the sending or receiving subscriber is subscribed to a message converting service;

means for determining with reference to the recording means whether the sending subscriber is subscribed to the message converting service when a SMS is received from the sending subscriber terminal;

means for receiving a message converting request from the determining means, and converting the SMS into a SMS or MMS in the previously registered format; and means for sending the converted SMS or MMS to the receiving subscriber terminal.

In a third aspect of the present invention, there is also provided a system for sending/receiving a SMS between CDMA subscriber terminals that are capable of sending/receiving SMS and/or MMS in a CDMA network, the system comprising: a HLR for storing and managing subscriber information, subscription information to coordination service for decorating a SMS, SMS service profile related to an attribute of the coordination service, and location information of a subscriber terminal; a PCX/MSC for receiving and storing the SMS service profile from the HLR when a location of the sending CDMA subscriber terminal (hereinafter, referred to as a sending terminal) is registered, and recording the SMS service profile to a SMDPP (Short Message Deliver Point to Point) message and sends the SMDPP to a SMSC (Short Message Service Center) in case a SMS is sent from the sending terminal; a SMSC for recording the coordination service attribute information to a DELIVER message and sends the DELIVER message to a message converting center in case the coordination service subscription is set in the SMS service profile; and a message converting center for converting the SMS into a coordination message by decorating the SMS based on the coordination service attribute information, and sends the coordination message to the receiving CDMA subscriber terminal (hereinafter, referred to as a receiving terminal) via the SMSC.

In a fourth aspect of the present invention, there is also provided a method for decorating a SMS sent/received between a sending CDMA subscriber terminal (hereinafter, referred to as a sending terminal) at least capable of sending a SMS and a receiving CDMA subscriber terminal (hereinafter, referred to as a receiving terminal) capable of receiving and outputting a SMS and/or MMS, the method comprising: (a) a sending subscriber making a SMS using the sending terminal, and sending the SMS to a PCX/MSC of a sender via a BTS (Base Station Transceiver Subsystem); (b) determining whether the corresponding sending subscriber is subscribed to a SMS decorating service (hereinafter referred to as message coordination service); (c) sending the coordination service subscription information to a SMSC holding the receiving subscriber in case the sending subscriber is subscribed to the message coordination service; (d) sending the coordination service subscription information and the SMS data to a MCS; (e) converting the SMS data into a coordination message in a format previously registered by the sending subscriber; and (f) sending the coordination message to the receiving terminal.

In a fifth aspect of the present invention, there is also provided a method for decorating a SMS sent from a sending CDMA subscriber terminal (hereinafter, referred to as a sending terminal) to a receiving CDMA subscriber terminal (hereinafter, referred to as a receiving terminal), the method comprising: (a) receiving SMS service profile information of the corresponding sending subscriber from a HLR when a location of the sending terminal is registered, and storing and managing the SMS service profile information in a PCX/MSC of a sender; (b) the sending subscriber making a SMS using the sending terminal, the SMS being sent to the PCX/MSC of the sender via a BTS; (c) determining based on the SMS service profile of the sending subscriber whether the corresponding sending subscriber is subscribed to a SMS decorating service (hereinafter, referred to as message coordination service); (d) recording the SMS service profile to a SMDPP message and sending the SMDPP message to a SMSC, in case the sending subscriber is subscribed to the message coordinating service; (e) recording the SMS in a DELIVER message and sending the DELIVER message to a MCS, in case the message coordination service is activated in the SMS service profile; (f) decorating the SMS into a coordination message based on a format previously registered by the sending subscriber; and (g) sending the decorated coordination message to the receiving terminal via the SMSC.

In a sixth aspect of the present invention, there is also provided a system for sending/receiving a SMS between WCDMA subscriber terminals capable of sending/receiving a SMS and/or MMS in a WCDMA network, the system comprising:

a DS-HLR for storing and managing subscription information to coordination service for decorating a SMS, SMS service profile related to an attribute of the coordination service, and location information of a subscriber terminal; a MSC/SGSN (Mobile Switching Center/Serving GPRS Supporting Node) for receiving and storing the SMS service profile from the DS-HLR when a location of the sending WCDMA subscriber terminal (hereinafter, referred to as a sending terminal) is registered, and recording the SMS service profile to a message and sends the message to a DS-SMSC holding a receiving subscriber in case a SMS is sent from the sending terminal; a DS-SMSC for sending the coordination service subscription information and the sending subscriber information to a message converting center; and a message converting center for converting the SMS into a coordination message by decorating the SMS in a previously registered format, and sends the coordination message to the receiving CDMA subscriber terminal (hereinafter, referred to as a receiving terminal) via the DS-SMSC.

In a seventh aspect of the present invention, there is also provided a method for decorating a SMS sent/received between a sending WCDMA subscriber terminal (hereinafter, referred to as a sending terminal) at least capable of sending a SMS and a receiving WCDMA subscriber terminal (hereinafter, referred to as a receiving terminal) capable of receiving and outputting a SMS and/or MMS, the method comprising: (a) a sending subscriber making a SMS using the sending terminal, and sending the SMS to a MSC/SGSN of a sender via a RTS (Radio Transceiver Subsystem); (b) determining whether the corresponding sending subscriber is subscribed to a SMS decorating service (hereinafter referred to as message coordination service); (c) sending the coordination service subscription information to a DS-SMSC holding the receiving subscriber in case the sending subscriber is subscribed to the message coordination service; (d) sending the coordination service subscription information and the SMS data to a MCS; (e) converting the SMS data into a coordination message in a format previously registered by the sending subscriber; and (f) sending the coordination message to the receiving terminal.

In an eighth aspect of the present invention, there is also provided a method for decorating a SMS sent from a sending WCDMA subscriber terminal (hereinafter, referred to as a sending terminal) to a receiving WCDMA subscriber terminal (hereinafter, referred to as a receiving terminal), the method comprising: (a) receiving SMS service profile information of the corresponding sending subscriber from a DS-HLR when a location of the sending terminal is registered, and storing and managing the SMS service profile information in a MSC/SGSN of a sender; (b) the sending subscriber making a SMS using the sending terminal, the SMS being sent to the MSC/SGSN of the sender via a RTS; (c) determining based on the SMS service profile of the sending subscriber whether the corresponding sending subscriber is subscribed to a SMS decorating service (hereinafter, referred to as message coordination service); (d) recording the SMS service profile to a Forward_SM message and sending the Forward_SM message to a DS-SMSC, in case the sending subscriber is subscribed to the message coordinating service; (e) recording the SMS in a DELIVER message and sending the DELIVER message to a MCS, in case the message coordination service is activated in the SMS service profile; (f) decorating the SMS into a coordination message based on a format previously registered by the sending subscriber; and (g) sending the decorated coordination message to the receiving terminal via the DS-SMSC.

BRIEF DESCRIPTION OF THE DRAWINGS

FIG. 4 shows definitions of parameters for SMS_ServiceProfile according to IS-41D protocol;

FIG. 5 shows a data structure expressing an attribute of SMS sending service in SMS VAD service;

FIG. 6 shows a data structure showing an attribute of SMS receiving service in SMS VAD service;

FIG. 10 shows a data structure of an Extension set of MSP-Extension; and

FIG. 11 is a table showing an attribute of SMS indicator included in the Extension set.

BEST MODE FOR CARRYING OUT THE INVENTION

Hereinafter, preferred embodiments of the present invention will be described in detail with reference to the accompanying drawings.

First Embodiment

Figure 1:
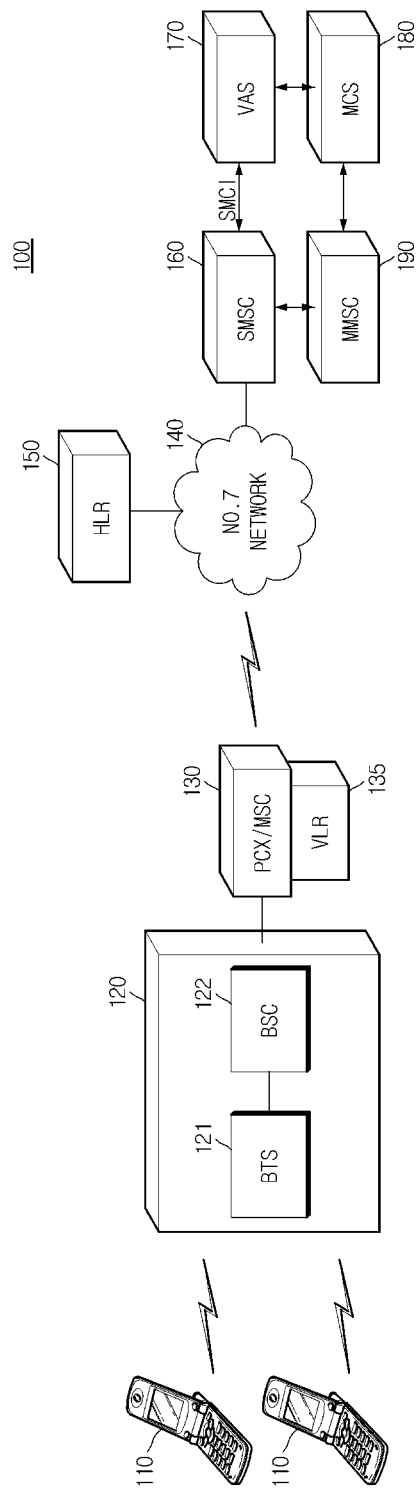
FIG. 1 shows a CDMA network for realizing a message coordination service according to a first embodiment of the present invention.

First, FIG. 1 shows a CDMA network for realizing a message coordination service according to a first embodiment of the present invention.

Referring to FIG. 1, the system 100 for converting a short message according to the present invention includes a plurality of subscriber terminals 110 located in a communication area that is divisionally allocated to each sector; BTS (Base station Transceiver Subsystem) 121 for wirelessly communicating with the subscriber terminals 110; BSC (Base Station Controller) 122 for controlling the BTS 121; PCX/MSC (Personal Communication eXchange/Mobile Switching Center) 130; VLR (Visitor Location Register) 135; No. 7 network 140; HLR (Home Location Register) 150; VAS (Value Added Service Server) 170; SMSC (Short Message Service Center) 160; MMSC (Multimedia Message Service Center) 190; and MSC (Message Coordination Server) 180.

The subscriber terminal 110 takes a charge of sending or receiving SMS in addition to basic call processing and location registering. In addition, the subscriber terminal 110 may have functions of receiving and outputting MMS. The subscriber terminal 110 according to the present invention includes cellular phone, PCS (Personal Communication Service) phone, PDA phone, GSM phone, WCDMA phone, CDMA-2000 phone, DMB phone and so on.

A wireless network 120 ensures mobility of the subscriber terminals and has hand-off function and wireless resource managing function. The wireless network 120 is composed of the BTS 121 and the BSC 122 and allows the subscriber terminal 110 to access the No. 7 network 140 using a wireless protocol between the subscriber terminal 110 and the PCX/MSC 130. In particular, the BTS 121 receives a SMS from a sending subscriber terminal (hereinafter, referred to as a sending terminal) using a paging channel or a traffic channel among signal channels, and then transmits the SMS to the BSC 122. The BSC 122 controls the BTS 121, and functions to allocate and release a wireless channel to the subscriber terminal, control transmission powers of the subscriber terminal and the BTS, determine soft hand-off or hard hand-off of between cells, conduct transcoding and vocoding, and operate and maintain the BTS.

The PCX/MSC 130 conducts processing basic and value-added services, processing a sending or received call of a subscriber, processing location registration, and linking to another network. In addition, the VLR 135 temporarily stores a location of a subscriber located within a communication area of the PCX/MSC 130 and subscriber information.

In the present invention, the PCX/MSC 130 of a sender receives subscriber information and value-added service subscription and activating information of a corresponding sending terminal from the HLR 150 when a location of the sending terminal is registered, and then stores and manages the information. In particular, SMS sending service attribute information as shown in FIG. 5 is recorded in a location registration request signal (REG-NOT: Registration Notification Return Result) received from the HLR 150. This SMS sending service attribute information includes a message manager field (G bit), a message coordination service field (F bit) and Deco-SMS field (E bit). Thus, if SMS is sent from the sending terminal 110, the PCX/MSC 130 of the sender checks a message coordination service field of the SMS sending service attribute sent from the HLR 150 to determine whether a corresponding subscriber is subscribed to the message coordination service. At this time, in case the corresponding subscriber is subscribed to the message coordination service, SMDPP (Short Message Deliver Point to Point) message in which "the message coordination service field" in the SMS_ServiceProfile area is activated is sent to the SMSC 160. Specific parameters for the "SMS_ServiceProfile" are defined in FIG. 4.

The HLR 150 stores and manages subscriber information, value-added service information of each subscriber, and location information of mobile communication terminals. In particular, the HLR 150 stores profile information of sending and receiving terminals. This profile information includes MIN (Mobile Identification Number) of a subscriber terminal, ESN (Electronic Serial Number), subscribed mobile communication value-added service information and so on. Thus, the information of a subscriber subscribed to the message coordination service of the present invention is recorded in the profile information.

That is to say, the HLR 150 records the SMS sending service attribute of FIG. 5 to an answer (reg-not) message to the REG-NOT of the sending terminal, and then sends it to the PCX/MSC 130 of the sender.

The SMSC 160 functions to process basic services for SMS and temporarily store or send data required for processing SMS. In addition, the SMSC 160 conducts a gate function for SMS, processes SMS MAP (Mobile Application Part) for linking with PCX/MSC 130 and the HLR 150, and conducts a protocol matching function for linking with an external service provider.

In particular, the SMSC 160 of the present invention receives the SMDPP message including "SMS_ServiceProfile" as shown in FIG. 4 from the PCX/MSC of the sender, and determines whether the message coordination service field of "SMS_ServiceProfile" is activated. At this time, if the message coordination service field is activated, "SM Origination VAD Service" of the sending subscriber is recorded in a SM field of the "DELIVER" message, and then sent to the VAS 170.

In addition, the SMSC 160 obtains SMS receiving service attribute data as shown in FIG. 6 from a location information answer (smr) message of the HLR 150 for the location information request (SMR) message of a receiving subscriber. A set value-added service is reflected on SMS to be sent, based on the SMS receiving service attribute data.

The VAS 170 accesses the SMSC 160 through SMCI (Short Message Client Interface) based on TCP/IP. This VAS 170 processes all value-added service information by means of the accessing function to the SMSC, and conducts overall management for subscribers, payment, and operation of SMS.

In particular, the VAS 170 of the present invention receives a SMS deliver message (DELIVER message) sent from the SMSC 160, determines based on "SM Origination VAD Service" recorded in the SM field of the SMS deliver message whether the corresponding sending subscriber is subscribed to the message coordination service, and then extracts SMS from the SMS deliver message and sends it to the MCS 180 if the sending subscriber is subscribed to the message coordination service.

In addition, in case the coordination message converted by the MCS 180 is a SMS, the VAS 170 receives the SMS coordination message from the MCS 180, and then records the coordination message to a SMS submit message (SUBMIT message) and sends it to the SMSC 160.

The MCS 180 generates a new SMS or multimedia message (LMS(Long Message Service)/MMS) by adding an emoticon (e.g., a text emoticon or a graphic emoticon), an image, a moving picture or a sound to SMS sent from the VAS according to a preset rule (preferably, set by a user in advance). In particular, the format of changing the SMS by decoration is depending on an attribute requested by the subscriber. In addition, in case the message changed by decoration is SMS, the MCS 180 sends it to the VAS 170, while, in case the changed message is MMS (or, LMS), the MCS 180 sends it to the MMSC 190 (or, LMSC (Long Message Service Center)).

The MMSC 190 records LMS/MMS, converted by the MCS 180, to a SMS submit message (SUBMIT message), and then sends it to the SMSC 160.

The system of the present invention has been explained based on the case that the sending and receiving subscribers are all CDMA subscribers, and the mobile communication network is a CDMA network. However, the system of the present invention is not limited to the above.

That is to say, the system of the present invention may be applied identically to the cases that the mobile communication network is a CDMA network, at least one of the sending and receiving subscribers is a WCDMA subscriber, and the WCDMA subscriber is roaming in the CDMA network. In this case, the PCX/MSC may be substituted with IMX/SGSN, the HLR may be substituted with DS-HLR, and the SMSC may be substituted with DS-SMSC. That is to say, in case the sending or receiving subscriber is a WCDMA subscriber roaming to the CDMA network, the location information or the profile information of the sending or receiving subscriber is obtained from the DS-HLR.

Hereinafter, the coordination message transmitting process executed based on the above system will be schematically explained as follows.

A subscriber who desires to use the message coordination service of the present invention accesses MCS using a wired/wireless Internet, and then sets and registers his/her own subscriber number (e.g., MIN or ESN) and multimedia contents to be converted. This message coordination service subscription registration information is stored in HLR/DS-HLR that holes the corresponding subscriber via WISE (Wireless Information Service Environment). At this time, the message coordination service subscription registration information is recorded to HLR in case the subscriber is a CDMA subscriber, and recorded to DS-HLR in case the subscriber is a WCDMA subscriber. Here, the term "message coordination service" is defined as a service for converting a short message into SMS including an emoticon or LMS/MMS including image, moving picture, sound and so on.

The message coordination service subscription registration stored in HLR is sent to VLR of MSC that manages the corresponding subscriber terminal when registering the location of the corresponding subscriber, and then stored therein.

If the subscriber sends SMS using his/her own terminal, the MSC of the sender that manages the sending subscriber refers to the VLR to check whether the corresponding subscriber is subscribed or registered to the message coordination service.

At this time, if it is checked that the corresponding sending subscriber is subscribed or registered to the message coordination service, the SMS and the message coordination service subscription registration information are sent to SMSC/DS-SMSC that holes a receiving terminal. The SMSC/DS-SMSC requests conversion of the SMS to the MCS based on the message coordination service subscription registration information included in the sent message. Accordingly the MCS converts the SMS into a coordination message based on the multimedia contents registered by the corresponding subscriber, and then returns it to the SMSC/DS-SMSC.

The SMSC/DS-SMSC receiving the converted coordination message from the MCS checks location information of the receiving terminal through the HLR of the receiver, and then sends the coordination message to the MSC that holes the receiving terminal. The MSC of the receiver sends the coordination message to the receiving terminal in the format of SMS or MMS.

Accordingly, the present invention may convert SMS into a coordination message having a multimedia format using a message sent from MSC to SMSC without any special action of a sending subscriber or upgrade of a sending terminal. Thus, it is possible to enhance efficiency of a signal network realizing the message decorating service, and improve quality of service by simplification of SMS call processing.

Hereinafter, a call processing procedure for converting SMS, sent from a sending terminal, to a short coordination message (SMS) or a multimedia coordination message (MMS) based on the system and technical spirit of the present invention will be described in detail.

Figure 2:
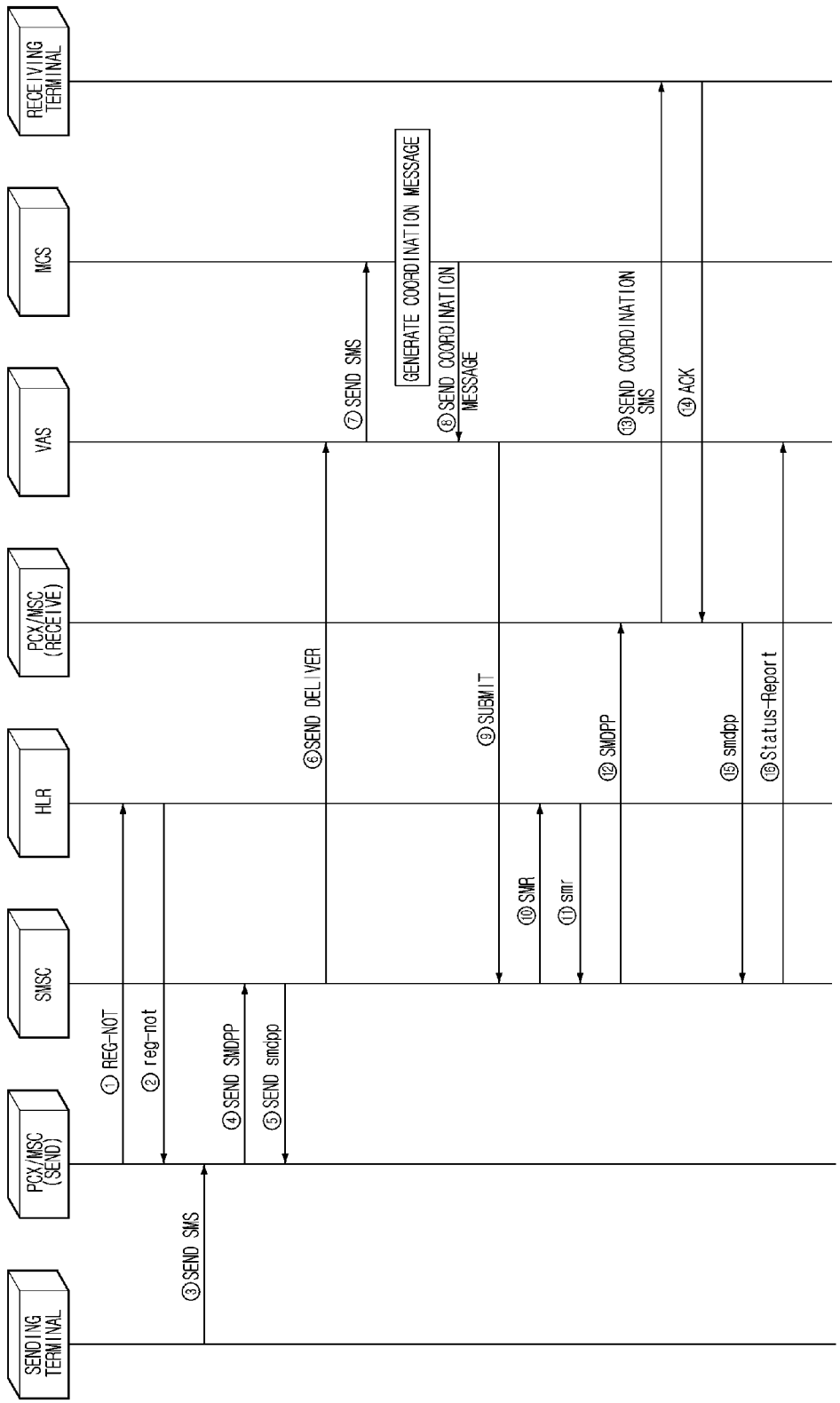
FIG. 2 is a flowchart illustrating a call processing of the message coordination service (SMS-SMS) according to the first embodiment of the present invention.

First, a method for generating a short coordination message by adding a text or text emoticon to SMS sent from a sending terminal, and then sending it to a receiving terminal will be explained with reference to FIG. 2.

If a mobile telephone service subscriber goes into a communication area covered by a certain BTS 121 with possessing his/her own sending terminal 110, the corresponding BTS 121 sends location information of the corresponding terminal, detected by wireless communication with the sending terminal, to a PCX/MSC 130 connected to the BTS 121.

Accordingly, the PCX/MSC 130 sends a location registration request signal (Reg-Not: Registration Notification), requesting registration of the location information of the sending terminal, to a HLR 150 that manages subscriber information of the sending terminal (Step 1). The corresponding HLR 150 receiving the location registration request signal sends a signal (Reg-Can), requesting to delete the location information of the sending terminal, to the PCX/MSC and the VLR that covers a communication area where the subscriber of the sending terminal is located before. The corresponding PCX/MSC and VLR receiving the location information deletion request signal delete all information of the corresponding subscriber, and then sends a deletion response signal (reg-can) informing of the deletion to the HLR. The HLR receiving the location information deletion response updates and stores the new location information of the sending terminal to a database, and then sends a location registration request signal (reg-not) informing of the update and storing to the PCX/MSC and VLR that manage the communication area of the sending terminal (Step 2).

At this time, the location registration request signal (reg-not) includes the subscriber information of the sending terminal and the value-added service subscription and activating information, and particularly includes the SMS service profile information as shown in FIG. 4.

The SMS_ServiceProfile shown in FIG. 4 is sent from the HLR 150 to the PCX/MSC 130 of the sender when the location of the sending terminal 110 is registered, and it includes "SMS_VAD_Service" information.

Attribute and value-added service of SMS_VAD_Service are set to "Notes b" of "SMS_VAD_Service", and SMS sending service attribute of FIG. 5 or SMS receiving service attribute of FIG. 6 is defined in "Notes c". In particular, the SMS sending service attribute of FIG. 5 has a message coordination field and a Deco-SMS field. By checking an activated state of the message coordination field, it is possible to check whether the corresponding subscriber is subscribed to the service.

The PCX/MSC 130 of the sender, which receives the subscriber information and the value-added service subscription and activating information, particularly the SMS service profile, from the HLR 150, stores and manages the information in VLR.

If the subscriber makes SMS using his/her own sending terminal 110 and sends the SMS to a BTS together with a sending terminal number and a receiving terminal number, the BTS 121 transmits the SMS to a PCX/MSC 130 of the sender where the sending terminal is located (Step 3). At this time, the SMS is stored in a bearer data and sent to the PCX/MSC 130.

The PCX/MSC 130 of the sender receiving the SMS from the sending terminal reads the "SMS_ServiceProfile" (notifying that the message coordination service field is activated) corresponding to the respective subscriber from the VLR, and records the "SMS_ServiceProfile" to a SMDPP message to be sent to the SMSC 160 holding the receiving subscriber (Step 4).

The SMSC 160 receiving the SMDPP message from the PCX/MSC 130 sends a specific code, depending on success or failure of message delivery, to the PCX/MSC 130 in a smdpp(Ack) message format (Step 5).

The SMSC determines whether the "message coordination service field" of the SMS_ServiceProfile of the SMDPP message of the PCX/MSC is activated. At this time, if the message coordination service field is not activated, a process is progressed identically to a common SMS.

Meanwhile, if the "message coordination service field" is activated, "SM Origination VAD Service" information of the SMS_ServiceProfile is recorded in a SM field of the "DELIVER" message (SMS deliver message) and sent to the VAS 170 (Step 6).

The VAS 170 checks the message coordination service field of the "SM Origination VAD Service" recorded in the SM field of the DELIVER message sent from the SMSC 160 to determine whether the corresponding field is activated. At this time, if the corresponding field is activated, SMS is extracted from the "DELIVER" message, and the extracted SMS is sent to the MCS 180. At this time, the SMS value-added service subscription information of the subscriber is sent together with the SMS (Step 7).

The MCS 180 receiving the SMS from the VAS 170 adds a text or a text emoticon to the SMS according to a preset rule to generate a new converted coordination message.

The generated coordination message is sent to the VAS 170 again (Step 8), and the VAS 170 records this coordination message to a "SUBMIT" message (SMS submit message) and sends it to the SMSC 160 (Step 9).

The SMSC 160 receiving the "SUBMIT" message having the coordination message from the VAS 170 extracts and temporarily stores the coordination message from the "SUBMIT" message, and requests the subscriber location information (SMR) to the HLR 150 based on the mobile phone number of the receiving terminal (Step 10).

The HLR 150 receiving the request for subscriber location information from the SMSC 160 searches an internal database to find the location information where the receiving terminal is currently located, and then provides (smr) the search result to the SMSC 160 (Step 11). At this time, the SMS value-added service information of the receiving subscriber is also provided together with the location information.

The SMSC 160 checking the SMS value-added service information and the location information of the receiving terminal reflects the value-added service of the receiving subscriber on the SMS based on the SMS value-added service information. For example, in case the receiving subscriber is also subscribed to the message coordination service, the SMS is converted into a coordination message corresponding to the receiving subscriber through the steps 6 to 9. Of course, in case the sending subscriber and the receiving subscriber are all subscribed to the message coordination service, the sending subscriber has a priority to the receiving subscriber.

The coordination message is recorded in a SMDPP message, and then sent to the PCX/MSC 130 where the receiving terminal is located (Step 12).

The PCX/MSC 130 of the receiver receiving the SMDPP message from the SMSC 160 stores the coordination message included in the SMDPP message to the bearer data, and then sends it to the receiving terminal 110 (Step 13).

The receiving terminal 110 receiving the coordination message from the PCX/MSC 130 of the receiver sends a specific code according to success or failure of message transmission in an Ack message format as a response (Step 14), and the response result is sent to the SMSC in a SDMPP message format (Step 15).

If the SMS coordination message is completely received, the SMSC 160 sends its status report (Status_Report) to the VAS 170, and the VAS 170 sends the status report to the MCS 180 again (Step 16). The MCS 180 receiving the status report for the receiving completion conducts updating to WINGS (Wireless Internet Gateways).

Thus, the receiving terminal subscriber may receive check the coordination message decorated with additional text or emoticon in SMS.

Figure 3:
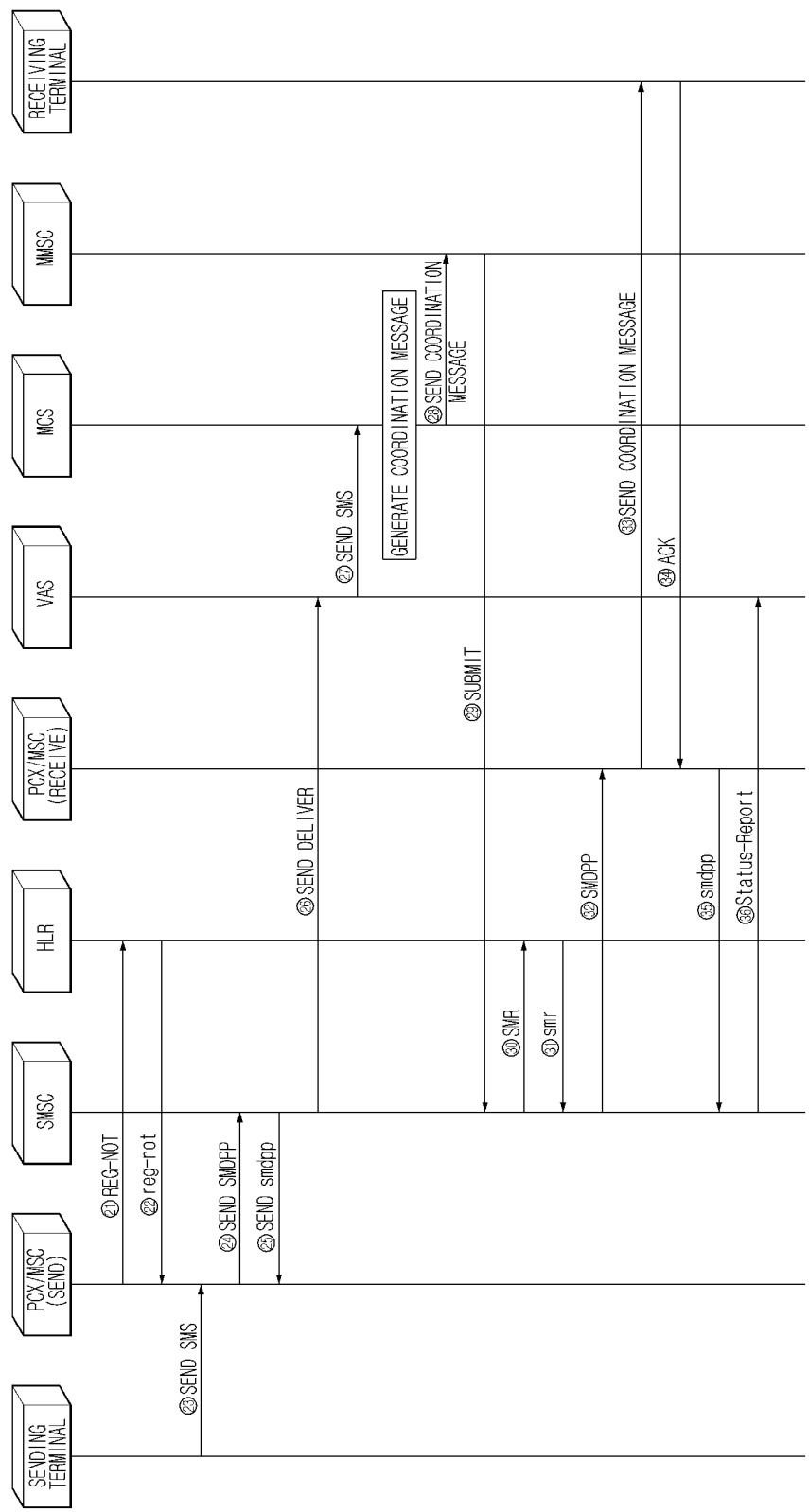
FIG. 3 is a flowchart illustrating a call processing of a message coordination service (SMS-MMS) according to a modification of FIG. 2.

Now, a method for generating a coordination message by adding multimedia data such as graphic, image, moving picture and sound to SMS sent from a sending message, and then sending the coordination message to a receiving terminal according to a modification of the first embodiment will be explained with reference to FIG. 3.

If a subscriber of a mobile telephone service moves to a communication area covered by a certain BTS 121 with possessing his/her own sending terminal 110, the corresponding BTS 121 sends location information of the corresponding terminal, detected by wireless communication with the sending terminal 110, to a PCX/MSC 130 of the sender connected to the BTS 121.

Accordingly, the PCX/MSC 130 sends a location registration request signal (Reg-Not: Registration Notification), requesting registration of location information of the sending terminal, to the HLR 150 managing subscriber information of the sending terminal (Step 21). The corresponding HLR 150 receiving the location registration request signal sends a signal (Reg-Can), requesting deletion of location information of the sending terminal, to PCX/MSC and VLR that cover a communication area where the subscriber of the sending terminal was located before. The corresponding PCX/MSC and VLR receiving the location information deletion request signal deletes all information of the corresponding subscriber and also sends a location information deletion response (reg-can) signal to the HLR 150 to inform of the deletion. The HLR 150 receiving the location information deletion response updates and stores new location information of the sending terminal to a database, and then sends a location registration request signal (reg-not) informing of the updating and storing to PCX/MSC and VLR covering a communication area of the sending terminal (Step 22).

At this time, the location registration request signal (reg-not) includes subscriber information and value-added service subscription and activating information of the sending terminal, and particularly includes SMS service profile information as shown in FIG. 4.

The PCX/MSC 130 receiving the subscriber information and the value-added subscription and activating information, and particularly the SMS service profile, from the HLR 150 stores and manages the information in the VLR.

If the subscriber makes SMS using his/her own sending terminal 110 and sends the SMS to the BTS together with a sending terminal number and a receiving terminal number, the BTS 121 sends the SMS to the PCX/MSC 130 of the sender where the sending terminal is located (Step 23). At this time, the SMS is stored in a bearer data and sent to the PCX/MSC 130.

The PCX/MSC 130 of the sender receiving the SMS from the sending terminal 110 reads the "SMS service profile" (where a message coordination service field is activated) corresponding to the subscriber, and records the "service profile" to a SMDPP message and sends it to the SMSC 160 holding the receiving subscriber (Step 24).

The SMSC 160 receiving the SMDPP from the PCX/MSC 130 sends a specific code according to success or failure of message transmission to the PCX/MSC 130 in a smdpp(Ack) format (Step 25).

The SMSC determines whether the "message coordination service field" of the SMS service profile of the SMDPP message of the PCX/MSC is activated. At this time, if the message coordination service field is not activated, a process is executed identically to a common SMS.

Meanwhile, if the "message coordination service field" is activated, the "SM Origination VAD Service" information of the SMS service profile is recorded in a SM field of a DELIVER message (SMS deliver message) and sends it to the VAS 170 (Step 26).

The VAS 170 checks the message coordination service field of "SM Origination VAD Service" recorded in the SM field of the DELIVER message sent from the SMSC 160 to determine whether the corresponding field is activated. At this time, if the corresponding field is activated, the SMS is extracted from the DELIVER message, and the extracted SMS is sent to the MCS 180. At this time, the SMS value-added subscription information of the subscriber is sent together with the SMS (Step 27).

The MCS 180 receiving the SMS from the VAS 170 generates a converted coordination message by adding graphic, image, moving picture, sound and so on to the SMS according to the SMS service attribute of the subscriber, previously registered.

The generated multimedia coordination message is sent to MMSC 190 (Step 28), and the MMSC 190 records the multimedia coordination message to a SUBMIT message (SMS submit message) and sends it to the SMSC 160 (Step 29).

The SMSC 160 receiving the SUBMIT message recording the multimedia coordination message from the MMSC 190 extracts and temporarily stores the coordination message from the SUBMIT message, and requests (SMR) subscriber location information to the HLR 150 based on the mobile phone number of the receiving terminal (Step 30).

The HLR 150 receiving a request for the subscriber location information from the SMSC 160 searches an internal database to find location information where the receiving terminal is currently located, and then provides (smr) the search result to the SMSC 160 (Step 31). At this time, the SMS value-added service information of the receiving subscriber is provided together with the location information.

The SMSC 160 checking the location information and the SMS value-added service information of the receiving terminal reflects the value-added service of the receiving subscriber on the SMS based on the SMS value-added service information. For example, in case the receiving subscriber is also subscribed to the message coordination service, the SMS is converted into a coordination message corresponding to the receiving subscriber through the steps 26 to 29. Of course, in case both the sending subscriber and the receiving subscriber are subscribed to the message coordination service, the sending subscriber has a priority to the receiving subscriber.

In this way, the SMSC 160 checking the location information of the receiving terminal records the coordination message to the SMDPP message and then sends it to the PCX/MSC 130 where the receiving terminal is located (Step 32).

The PCX/MSC 130 of the receiver receiving the SMDPP message from the SMSC 160 stores the coordination message recorded in the SMDPP message to the bearer data and sends it to the receiving terminal (Step 33).

The receiving terminal 110 receiving the coordination message from the PCX/MSC 130 of the receiver sends a specific code according to success or failure of message transmission to the PCX/MSC in an Ack message format as a response (Step 34), and this response result is sent to the SMSC in a SMDPP message format (Step 35).

If the multimedia coordination message is completely received, the SMSC 160 sends its status report (Status_Report) to the VAS 170, and the VAS 170 delivers the status report to the MCS 180 again (Step 36). The MCS 180 receiving the status report for the receiving completion conducts updating to WINGS.

Thus, the receiving terminal subscriber may receive and check a multimedia message in which a graphic, image, moving picture or sound is added to a text data.

Second Embodiment

Figure 7:
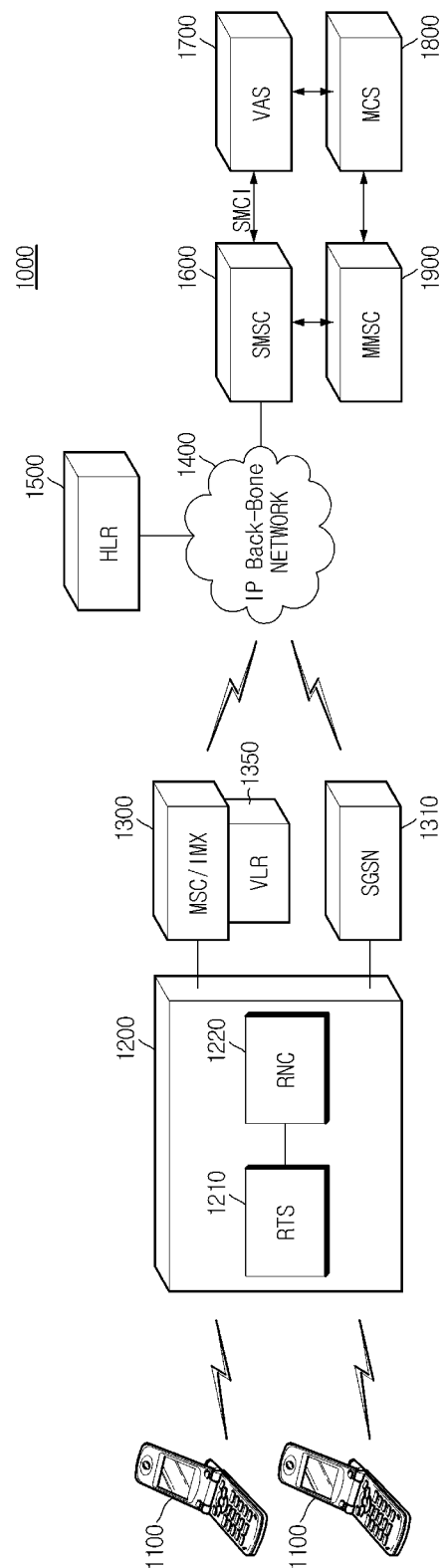
FIG. 7 shows a WCDMA network for realizing a message coordination service according to a second embodiment of the present invention.

FIG. 7 shows a WCDMA network for realizing a message coordination service according to a second embodiment of the present invention.

As shown in FIG. 7, the system 1000 for decorating a SMS according to the present invention includes a plurality of subscriber terminals 1100 located in a communication area divisionally allocated to each sector; RTS (Radio Transceiver Subsystem) 1210 for wireless communication with the subscriber terminals 1100; RNC (Radio Network Controller) 1220 for controlling the RTS 1210; a MCS/IMX (Mobile Switching Center/IP Multimedia eXchange) 1300; VLR (Visitor Location Register) 1350; a packet switch (SGSN: Serving GPRS Supporting Node) 1310; an IP backbone network 1400; DS-HLR (DS-Home Location Register) 1500; VAS (Value Added Service Server) 1700; DS-SMSC (DS-Short Message Service Center) 1600; MMSC (Multimedia Message Service Center) 1900; and MCS (Message Coordination Server) 1800.

The subscriber terminal 1100 uses SMS through CNS (Circuit Switched Network) and PSN (Packet Switched Network), and a software supporting SMS (Short Message Service) or MMS (Multimedia Message Service) should be loaded thereon so as to allow receiving or sending of SMS and/or MMS. The subscriber terminal 1100 according to the present invention includes cellular phones, PCS (Personal Communication Service) phones, PDA phones, GSM phones, CDMA-2000 phones, WCDMA phones, and DMB phones, and it is particularly a WCDMA phone.

The wireless network 1200 plays a role of ensuring mobility of the subscriber terminal, and conducts hand-off and wireless resource managing functions. The wireless network 1200 is composed of RTS 1210 and RNC 1220, and configures an access network for circuit connection or packet connection between the subscriber terminal 1100 and the core network.

The RTS 1210 conducts a wireless access termination function with a subscriber terminal according to the 3GPP wireless access standards, and particularly functions to send or receive voice, image and data traffic in a WCDMA manner. The RNC 1220 takes charges of wire/wireless channel management, protocol matching with a subscriber terminal, protocol matching between RTSes, soft hand-off processing, core network protocol processing, GPRS (General Packet Radio Service) access, fault management, system loading and so on. Here, GPRS is an asynchronous communication system that supports a data transmission rate of 115 kbps, provides a multimedia mail, and maximizes efficiency of transmission lines by means of packet-based data transmission.

The MCS/IMX 1300 shows a soft switching structure for high-rate call processing in addition to basic functions for voice communication in an existing IS-95B network. Here, the soft switching is used for upgrading a circuit switch of an existing exchange into a software switch to process voice, data and image signals with a high-speed packet switch.

The VLR 1350 plays a role of registering and managing location information of a subscriber terminal 1100 going into a control area of the MCS/IMX 1300, and informing the DS-HLR 1500 of the location information of the subscriber terminal, newly obtained. In addition, the VLR 1350 receives and manages a copy of profile information of the subscriber terminal 1100 received from the DS-HLR 1500, and at the same time utilizes the profile information for location control, call processing and value-added service processing of the subscriber terminal 1100. Here, the profile information is defined as MIN (Mobile Identification Number), ESN (Electrical Serial Number), and value-added service information of the subscriber terminal.

The packet switch (SGSN: Serving GPRS Supporting Node) 1310 has a hardware structure for providing a routing access and a switch based on ATM (Asynchronous Transfer Mode), and supports OS (Operating System) according to various data service processing. The OS has functions for GPRS mobility management, GPRS session management, GPRS certification and payment.

In the present invention, the MCS/IMX 1300 of the sender receives the subscriber information and the value-added service subscription and activating information of the corresponding sending terminal from the DS-HLR 1500 when registering the location of the sending terminal, and then stores and manages the information in the VLR 1350. In particular, a location registration response message (ids-ack) received from the DS-HLR 1500 includes "SMS indicator" in which the SMS sending service attribute information as shown in FIG. 11 is recorded. Thus, if SMS is sent from the sending terminal 1100, the MCS/IMX 1300 of the sender checks the SMS sending service attribute of the corresponding sending subscriber stored in the VLR 1350 to determine whether the corresponding subscriber is subscribed to the message coordination service. At this time, in case the corresponding subscriber is subscribed to the message coordination service, a Forward_SM message including "SMS indicator" indicating message coordination is sent to the DS-SMSC 1600.

The DS-HLR 1500 stores and manages the subscriber information, the value-added service information of each subscriber, and the location information of a mobile terminal. In particular, DS-HLR 1500 stores profile information of the sending and receiving terminals. This profile information includes MIN of the subscriber terminal, ESN, subscribed value-added service information and so on. Thus, the information of a subscriber subscribed to the message coordination service of the present invention is recorded in the profile information.

The DS-SMSC 1600 functions to temporarily store or send data used for processing basic service of SMS and processing the SMS. In addition, the DS-SMSC 1600 acts as a gate for SMS, processes SMS MAP (Mobile Application Part) for linkage with the packet switch 1310 and the DS-HLR 1500, and conducts protocol matching for linkage with an external service provider.

In particular, the DS-SMSC 1600 receives a Forward_SM message including "SMS indicator" having a configuration of FIG. 11 from the MCS/IMX 1300 of the sender and the packet switch 1310, and determines whether the message coordination service field of the "SMS indicator" is activated. At this time, if the message coordination service field is activated, the DS-SMSC 1600 records a command instruction conversion of SMS to a DELIVER message and sends it to the VAS 1700.

In addition, the DS-SMSC 1600 obtains SMS receiving service attribute data as shown in FIG. 11 from the location information response (ids) message of the DS-HLR 1500 for the location information request (IDS) message of the receiving subscriber. The SMS receiving service attribute data is used to determine whether there is a message coordination of SMS to be sent. At this time, if the receiving subscriber is subscribed to the message coordination service, the corresponding SMS is sent to the VAS 1700 to decorate the SMS into a previously registered format.

The VAS 1700 is connected to the DS-SMSC 1600 through SMCI (Short Message Client Interface) based on TCP/IP. This VAS 1700 processes all value-added information service using the connection function to the DS-SMSC, and conducts overall subscriber management, payment management and operation management for SMS.

In particular, the VAS 1700 of the present invention receives the SMS deliver message (DELIVER message) sent from the DS-SMSC 1600, determines based on the SMS sending service attribute recorded in the SMS deliver message whether the corresponding sending subscriber is subscribed to the message coordination service, and then extracts SMS from the SMS deliver message and sends it to the MCS 1800 in case the sending subscriber is subscribed to the message coordination service.

In addition, in case the coordination message generated by the MCS 1800 is a SMS, the VAS 1700 receives the SMS coordination message from the MCS 1800, records the coordination message to the SMS submit message (SUBMIT message), and then sends it to the DS-SMSC 1600.

The MCS 1800 generates a net SMS or LMS/MMS by adding a text, emoticon (text emoticon or graphic emoticon), image, moving picture or sound to the SMS sent from the VAS 1700 according to a preset rule. In particular, the SMS is decorated to change the message according to a format already registered by the subscriber. In addition, in case the message converted by message decoration is a SMS, the MCS 1800 sends the SMS to the VAS 1700, while, if the converted message is a MMS (or, LMS), the MCS 1800 sends it to the MMSC (or, LMSC) 1900.

The MMSC 1900 records the LMS/MMS converted by the MCS 1800 to the SMS submit message (SUBMIT message), and sends it to the DS-SMSC 1600.

Hereinafter, a call processing procedure for converting SMS, sent from a sending terminal, into a short coordination message (SMS) or a multimedia coordination message (MMS) will be described in detail based on the system and technical spirit of the present invention described above.

Figure 8:
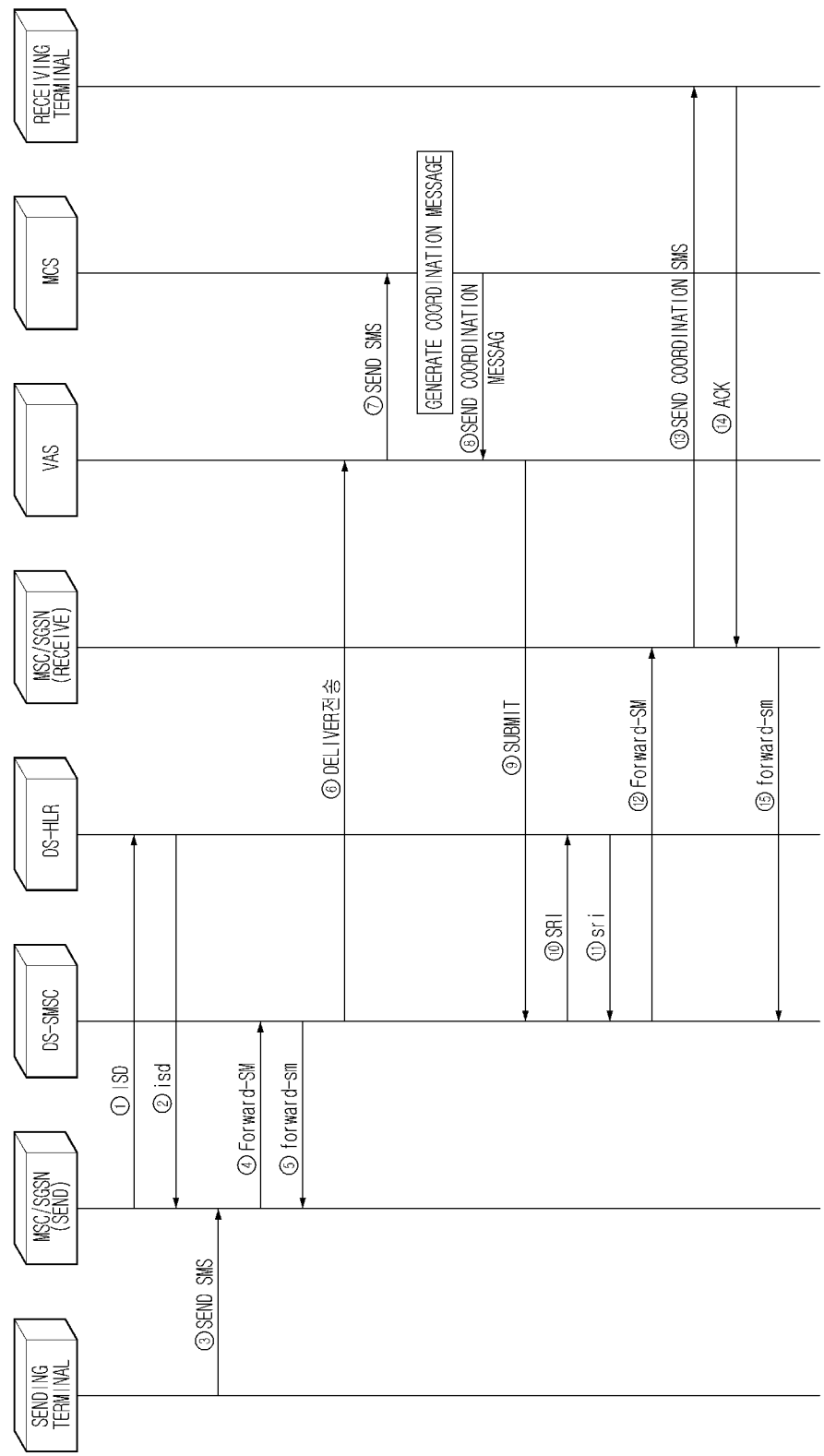
FIG. 8 is a flowchart illustrating a call processing of the message coordination service according to the second embodiment of the present invention.

Referring to FIG. 8, if a mobile phone service subscriber goes into a communication area covered by a certain RTS 1210 with possessing his/her own terminal 1100, the corresponding RTS 1210 sends location information of the corresponding terminal, detected by wireless communication with the sending terminal, to the MCS/IMX 1300 of the sender connected to the RTS 1210.

Accordingly, the MCS/IMX 1300 sends a location registration request signal (IDS), requesting registration of the location information of the sending terminal, to the DS-HLR 1500 managing the subscriber information of the sending terminal 1100 (Step 1). The corresponding DS-HLR 1500 receiving the location registration request signal (IDS) sends a signal, requesting deletion of location information of the sending terminal, to the MCS and the VLR covering a communication area where the subscriber of the sending terminal is previously located. The corresponding MSC and VLR receiving the location information deletion request signal deletes all information of the corresponding subscriber, and also sends a location information deletion response signal informing of the deletion to the DS-HLR. The DS-HLR receiving the location information deletion response updates and stores new location information of the sending terminal to a database, and then sends a location registration response signal (ids) informing of updating and storing to the MCS/IMX covering the communication area of the sending terminal after the storing step (Step 2).

At this time, the location registration response signal (ids) includes the subscriber information and the value-added service subscription and activating information of the sending terminal, and particularly includes "Origination Service Indicator" information as shown in FIG. 10.

The "Origination Service Indicator" information shown in FIG. 10 is sent from the DS-HLR 1500 to the MCS/IMX 1300 of the sender when the location of the sending terminal 1100 is registered, and it includes "SMS indicator" shown in FIG. 11.

The "SMS indicator" includes a SMS sending service attribute and a SMS receiving service attribute. Thus, by checking the "SMS indicator", it is possible to determine whether the sending subscriber or the receiving subscriber is subscribed to the message coordination service.

Here, the SMS sending service attribute indicates an attribute of the value-added service applied to SMS when a corresponding subscriber sends the SMS, while the SMS receiving service attribute indicates an attribute of the value-added service applied to SMS whose receiver is the corresponding subscriber.

The MCS/IMX 1300 receiving the "SMS indicator" including the subscriber information, the value-added service subscription information, and particularly the message coordination activating information from the DS-HLR 1500 stores and manages the information in the VLR.

After that, if the subscriber makes a SMS using his/her own sending terminal 1100 and sends the SMS to the RTS together with the sending terminal number and the receiving terminal number, the RTS 1210 sends the SMS to the MCS/IMX 1300 where the sending terminal is located (Step 3). At this time, the SMS is stored in a Bearer Data and sent to the MCS/IMX 1300.

The MCS/IMX 1300 of the sender receiving the SMS from the sending terminal reads the "SMS indicator" (in which the message coordination service is activated) corresponding to the respective subscriber from the VLR, and records the "SMS indicator" in a Forward_SM message and sends it to the DS-SMSC 1600 holding the receiving subscriber (Step 4).

The DS-SMSC 1600 receiving the Forward_SM message from the MCS/IMX 1300 returns a specific code according to success or failure of message transmission to the MCS/IMX 1300 in a forward_sm(Ack) format (Step 5).

The DS-SMSC 1600 checks the SMS sending service attribute information of the "SMS indicator" recorded in the Forward_SM message to determine whether the corresponding sending subscriber is subscribed to the message coordination service. At this time, if it is checked that the subscriber is not subscribed to the message coordination service, the process is executed identically to a common SMS.

Meanwhile, if it is checked that the corresponding sending subscriber is subscribed to the message coordination service, the "SMS indicator" information is recorded to the DELIVER message (SMS deliver message) and sent to the VAS 1700 (Step 6).

The VAS 1700 checks the SMS sending service attribute information of the DELIVER message sent from the DS-SMSC 1600 to determine whether or not to convert the SMS into a coordination message. At this time, if the SMS sending service attribute is set as conversion into a coordination message, the SMS is extracted from the DELIVER message, and the extracted SMS is sent to the MCS 1800 (Step 7).

The MCS 1800 receiving the SMS from the VAS 1700 adds a text or text emoticon to the SMS according to a format previously registered by the sending subscriber to generate a newly-converted coordination message.

The generated coordination message is sent to the VAS 1700 (Step 8), and the VAS 1700 records the coordination message to the SUBMIT message (SMS submit message) and returns it to the DS-SMSC 1600 (Step 9).

The DS-SMSC 1600 receiving the SUBMIT message recording the coordination message from the VAS 1700 extracts and temporarily stores the coordination message from the SUBMIT message, and then requests (SRI) subscriber location information to the DS-HLR 1500 holding the receiving terminal based on a network node number of the receiving terminal (Step 10).

The DS-HLR 1500 receiving a request for the subscriber location information from the DS-SMSC 1600 searches an internal database to find the location information where the receiving terminal is currently located, and then sends the search result to the DS-SMSC 1600 as a response (sri_ack) (Step 11). At this time, the location information is provided together with the SMS receiving service attribute information. That is to say, the DS-HLR 1500 records the "SMS indicator" of the receiving subscriber to ExtensionSet of MAP-Extension and provides it to the DS-SMSC 1600.

The DS-SMSC 1600 checking the location information of the receiving terminal and the SMS receiving service attribute reflects value-added service of the receiving subscriber on the SMS based on the SMS receiving service attribute. For example, in case the receiving subscriber is also subscribed to the message coordination service, the SMS is converted into a coordination message corresponding to the receiving subscriber through the steps 6 to 9. Of course, in case the sending subscriber and the receiving subscriber are all subscribed to the message coordination service, the sending subscriber has a priority to the receiving subscriber.

The DS-SMSC 1600 checking the location information of the receiving subscriber records the coordination message to the Forward_SM message, and sends it to the MCS/IMX 1300 where the receiving terminal is located (Step 12).

The MCS/IMX 1300 receiving the Forward_SM message from the DS-SMSC 1600 stores the coordination message included in the Forward_SM message to a Bearer Data and sends it to the receiving terminal 1100 (Step 13).

The receiving terminal 1100 receiving the coordination message from the MCS/IMX 1300 of the receiver sends a specific code according to success or failure of message transmission to the MCS/IMX 1300 in an Ack message format as a response (Step 14), and the response result is sent to the DS-SMSC 1600 in a forward_sm message format (Step 15).

If the SMS coordination message is completely received, the DS-SMSC 1600 sends its status report (Status_Report) to the VAS 1700, and the VAS 1700 sends the status report to the MCS 1800 again (Step 16).

Though this embodiment has been illustrated that a SMS sent from a sending terminal is sent to the MCS/IMX 1300, a SMS sent from a sending terminal may also be transmitted through the packet switch 1310 as shown in FIG. 7. For this purpose, when a wireless control station 1240 receives a SMS from the sending terminal, it is determined whether a line network service or a packet network service is used, and then it is determined which network is used for transmitting the SMS.

According to the above process, it is possible that the receiving terminal subscriber receives and checks a coordination message decorated with additional text or emoticon in SMS.

Figure 9:
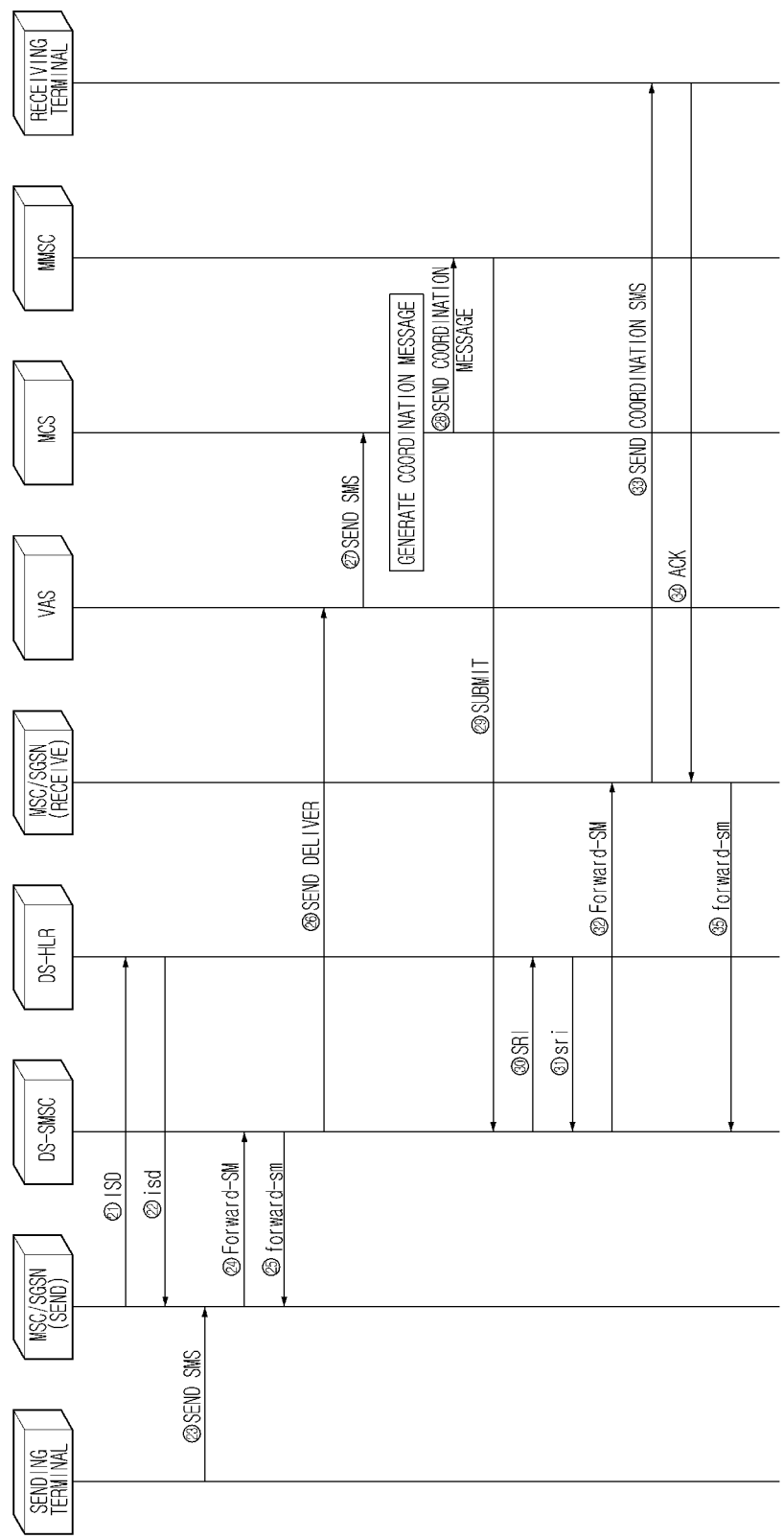
FIG. 9 is a flowchart illustrating a message coordination service (SMS-MMS) according to a modification of FIG. 8.

Now, a modification of the second embodiment of the present invention will be explained with reference to FIG. 9.

If a subscriber of the mobile telephone service goes into a communication area covered by a certain RTS 1210 with possessing his/her own sending terminal 1100, the corresponding RTS 1210 sends location information of the corresponding terminal, detected by wireless communication with the sending terminal, to the MCS/IMX 1300 of the sender connected to the RTS 1210.

Accordingly, the MCS/IMX 1300 sends a location registration request signal (IDS), requesting registration of the location information of the sending terminal, to the DS-HLR 1500 that manages the subscriber information of the sending terminal 1100 (Step 21). The corresponding DS-HLR 1500 receiving the location registration request signal (IDS) sends a signal requesting deletion of location information of the sending terminal to MSC and VLR covering a communication area where the subscriber of the sending terminal is previously located. The corresponding MSC and VLR receiving the location information deletion request signal deletes all information of the corresponding subscriber, and also sends a location information deletion response signal informing of the deletion to the DS-HLR. The DS-HLR receiving the location information deletion response updates and stores new location information of the sending terminal in a database, and then sends a location registration response signal (ids) informing of the updating and storing to the MCS/IMX 1300 covering the communication area of the sending terminal (Step 22).

At this time, the location registration response signal (ids) includes the subscriber information and the value-added service subscription and activating information, and particularly includes "Origination Service Indicator" as shown in FIG. 10.

The "Origination Service Indicator" information shown in FIG. 10 is sent from the DS-HLR 1500 to the MCS/IMX 1300 when the location of the subscriber terminal 1100 is registered, and it includes "SMS indicator" of FIG. 11.

The "SMS indicator" includes SMS sending service attribute and SMS receiving service attribute. Thus, by checking the "SMS indicator", it is possible to determine whether the subscriber is subscribed to the message coordination service or not.

Here, the SMS sending service attribute indicates an attribute of the value-added service applied to SMS when the corresponding subscriber sends the SMS, while the SMS receiving service attribute indicates an attribute of SMS applied when the corresponding subscriber is a receiver.

The MCS/IMX 1300 of the sender receiving the "SMS indicator" including the subscriber information, the value-added service subscription information, and particularly the message coordination service activating information from the DS-HLR 1500 stores and manages the information in the VLR.

After that, if the subscriber makes a SMS using his/her own sending terminal 1100 and sends the SMS to the RTS together with the sending terminal number and the receiving terminal number, the RTS 1210 sends the SMS to the MCS/IMX 1300 where the sending terminal is located (Step 23). At this time, the SMS is stored in a Bearer Data and sent to the MCS/IMX 1300.

The MCS/IMX 1300 of the sender receiving the SMS from the sending terminal reads the "SMS indicator" (in which the message coordination service is activated) corresponding to the respective subscriber from the VLR, and records the "SMS indicator" in a Forward_SM message and sends it to the DS-SMSC 1600 holding the receiving subscriber (Step 24).

The DS-SMSC 1600 receiving the Forward_SM message from the MCS/IMX 1300 returns a specific code according to success or failure of message transmission to the MCS/IMX 1300 in a forward_sm(Ack) format (Step 25).

The DS-SMSC 1600 checks the SMS sending service attribute information of the "SMS indicator" recorded in the Forward_SM message to determine whether the corresponding sending subscriber is subscribed to the message coordination service. At this time, if it is checked that the subscriber is not subscribed to the message coordination service, the process is executed identically to a common SMS.

Meanwhile, if it is checked that the corresponding sending subscriber is subscribed to the message coordination service, the "SMS indicator" information is recorded to the DELIVER message (SMS deliver message) and sent to the VAS 1700 (Step 26).

The VAS 1700 checks the SMS sending service attribute information recorded in the DELIVER message sent from the DS-SMSC 1600 to determine whether or not to convert the SMS into a coordination message. At this time, if the SMS sending service attribute is set as conversion into a coordination message, the SMS is extracted from the DELIVER message, and the extracted SMS is sent to the MCS 1800 (Step 27).

The MCS 1800 receiving the SMS from the VAS 1700 adds a graphic, image, moving picture, sound and so on to the SMS according to a format previously registered by the sending subscriber to generate a newly-converted coordination message.

The generated coordination message is sent to the MMSC 1900 (Step 28), and the MMSC 1900 records the coordination message to the SUBMIT message (SMS submit message) and returns it to the DS-SMSC 1600 (Step 29).

The DS-SMSC 1600 receiving the SUBMIT message recording the coordination message from the MMSC 1900 extracts and temporarily stores the coordination message from the SUBMIT message, and then requests (SRI) subscriber location information to the DS-HLR 1500 holding the receiving terminal based on a network node number of the receiving terminal (Step 30).

The DS-HLR 1500 receiving a request for the subscriber location information from the DS-SMSC 1600 searches an internal database to find the location information where the receiving terminal is currently located, and then sends the search result to the DS-SMSC 1600 as a response (sri_ack) (Step 31). At this time, the location information is provided together with the SMS receiving service attribute information. That is to say, the DS-HLR 1500 records the "SMS indicator" of the receiving subscriber to ExtensionSet of MAP-Extension and provides it to the DS-SMSC 1600.

The DS-SMSC 1600 checking the location information of the receiving terminal and the SMS receiving service attribute reflects value-added service of the receiving subscriber on the SMS based on the SMS receiving service attribute. For example, in case the receiving subscriber is also subscribed to the message coordination service, the SMS is converted into a coordination message corresponding to the receiving subscriber through the steps 26 to 29. Of course, in case the sending subscriber and the receiving subscriber are all subscribed to the message coordination service, the sending subscriber has a priority to the receiving subscriber.

The DS-SMSC 1600 checking the location information of the receiving subscriber records the coordination message to the Forward_SM message, and sends it to the MCS/IMX 1300 where the receiving terminal is located (Step 32).

The MCS/IMX 1300 receiving the Forward_SM message from the DS-SMSC 1600 stores the coordination message included in the Forward_SM message to a Bearer Data and sends it to the receiving terminal 1100 (Step 33).

The receiving terminal 1100 receiving the coordination message from the MCS/IMX 1300 of the receiver sends a specific code according to success or failure of message transmission to the MCS/IMX 1300 in an Ack message format as a response (Step 34), and the response result is sent to the DS-SMSC 1600 in a forward_sm message format (Step 35).

If the SMS coordination message is completely received, the DS-SMSC 1600 sends its status report (Status_Report) to the VAS 1700, and the VAS 1700 sends the status report to the MCS 1800 again (Step 36).

Though this embodiment has been illustrated that a SMS sent from a sending terminal is sent to the MCS/IMX 1300, a SMS sent from a sending terminal may also be transmitted through the packet switch 1310 as shown in FIG. 7. For this purpose, when a wireless control station 1240 receives a SMS from the sending terminal, it is determined whether a line network service or a packet network service is used, and then it is determined which network is used for transmitting the SMS.

According to the above process, it is possible that the receiving terminal subscriber receives and checks a multimedia message in which a graphic, image, moving picture, image or sound is added to a text data.

INDUSTRIAL APPLICABILITY

The present invention may realize the coordination service that decorates a SMS at a low cost just by utilizing a transmission message according to the protocol, without changing or correcting the essential network entities of a mobile telephone network.

In addition, the present invention does not need any separate user action such as selection of a special key or type style, or installation of a special program to a receiving or sending terminal.

The invention claimed is:

1. A system for sending/receiving a SMS between CDMA subscriber terminals that are capable of sending/receiving SMS and/or MMS in a CDMA network, the system comprising:
- a HLR for storing and managing subscriber information, a SMS service profile having attribute information and subscription information related to a coordination service for decorating a SMS, and location information of a subscriber terminal;
- a PCX/MSC (Personal Communication eXchange/Mobile Switching Center) for receiving and storing the SMS service profile from the HLR when a location of the sending CDMA subscriber terminal (hereinafter, referred to as a sending terminal) is registered, and recording the SMS service profile to a SMDPP (Short Message Deliver Point to Point) message and sends the SMDPP message to a SMSC (Short Message Service Center) in case a SMS is sent from the sending terminal;
- a SMSC for recording the attribute information to a DELIVER message and sends the DELIVER message to a message converting center in case a subscription of the coordination service is set in the SMS service profile; and
- a message converting center for converting the SMS into a coordination message by decorating the SMS based on the attribute information, and sends the coordination message to the receiving CDMA subscriber terminal (hereinafter, referred to as a receiving terminal) via the SMSC.

2. The system according to claim 1,
wherein the coordination message is a multimedia coordination message including a graphic, image, moving picture or sound.

3. The system according to claim 2, further comprising:
a LMSC/MMSC (Long Message Service Center/Multimedia Message Service Center) for receiving the multimedia coordination message from the message converting center, recording the multimedia coordination message to a SUBMIT message (SMS submit message), and sending the SUBMIT message to the SMSC.

4. The system according to claim 3, wherein the message converting center includes:
- a MCS (Message Coordination Server) for decorating the SMS into the multimedia coordination message, and sending the decorated coordination message to the LMSC/MMSC; and
- a VAS (Value Added Service Server) for sending the SMS to the MCS in case the coordination service is activated in the DELIVER message received from the SMSC.

5. The system according to claim 1,
wherein the coordination message is a SMS including a text or emoticon.

6. The system according to claim 5, wherein the message converting center includes:
- a MCS for decorating the SMS into the coordination message; and
- a VAS for sending the SMS to the MCS in case the coordination service is activated in the DELIVER message received from the SMSC.

7. The system according to claim 4 or 6,
wherein the SMSC records the attribute information of the coordination service to a SM field of the DELIVER message and sends the DELIVER message to the MCS, in case a message coordination service field of the SMS service profile received from the PCXIMSC is activated.

8. A method for decorating a SMS sent from a sending CDMA subscriber terminal (hereinafter, referred to as a sending terminal) to a receiving CDMA subscriber terminal (hereinafter, referred to as a receiving terminal), the method comprising:
- (a) receiving SMS service profile information of the corresponding sending subscriber having attribute information and subscription information related to a message coordination service for decorating a SMS from a HLR when a location of the sending terminal is registered, and storing and managing the SMS service profile information in a PCX/MSC where the sending terminal is located;
- (b) the sending subscriber making a SMS using the sending terminal, and sending the SMS to the PCX/MSC where the sending terminal is located via a BTS;
- (c) determining based on the SMS service profile information of the sending subscriber whether the corresponding sending subscriber is subscribed to the message coordination service;
- (d) recording the SMS service profile information to a SMDPP message and sending the SMDPP message to a SMSC, in case the sending subscriber is subscribed to the message coordination service;
- (e) recording the SMS in a DELIVER message and sending the DELIVER message to a message converting center, in case the message coordination service is activated in the SMS service profile information;
- (f) decorating the SMS into a coordination message based on a format previously registered by the sending subscriber; and
- (g) sending the decorated coordination message to the receiving terminal via the SMSC.

9. The method according to claim 8,
wherein the coordination message is a MMS including a graphic, image, moving picture or sound.

10. The method according to claim 9, wherein the step (g) includes:
sending the coordination message to a LMSC/MMSC;
sending the coordination message to the SMSC using a SUBMIT message;
obtaining location information of the receiving terminal from a HLR;
storing the coordination message to a Bearer Data and sending the Bearer Data to a PCX/MSC where the receiving terminal is located, in a SMDPP format; and
sending the coordination message to the receiving terminal via the BTS.

11. The method according to claim 8,
wherein the coordination message is a SMS including a text or emoticon.

12. The method according to claim 11, wherein the step (g) includes:
sending the coordination message to a SMSC using a SUBMIT message;
obtaining location information of the receiving terminal from a HLR;
storing the coordination message to a Bearer Data and sending the Bearer Data to a PCX/MSC where the receiving terminal is located, in a SMDPP format; and
sending the coordination message to the receiving terminal via a BTS.

13. The method according to claim 10 or 12, further comprising the steps of:
sending a specific code (Ack) according to success or failure of transmission from the PCX/MSC where the receiving terminal is located to the SMSC; and
sending a status report (Status_Report) based on the specific code to the message converting center.

14. A system for sending/receiving a SMS between WCDMA subscriber terminals capable of sending/receiving a SMS and/or MMS in a WCDMA network, the system comprising:
a DS-HLR for storing and managing subscriber information, a SMS service profile having attribute information and subscription information related to a coordination service for decorating a SMS, and location information of a subscriber terminal;
a MSC/SGSN (Mobile Switching Center/Serving GPRS Supporting Node) for receiving and storing the SMS service profile from the DS-HLR when a location of the sending WCDMA subscriber terminal (hereinafter, referred to as a sending terminal) is registered, and recording the SMS service profile to a message and sends the message to a DS-SMSC holding a receiving subscriber in case a SMS is sent from the sending terminal;
a DS-SMSC for sending the SMS to a message converting center, in case a subscription of the coordination service is set in the SMS service profile; and
a message converting center for converting the SMS into a coordination message by decorating the SMS based on the attribute information, and sends the coordination message to the receiving WCDMA subscriber terminal (hereinafter, referred to as a receiving terminal) via the DS-SMSC.

15. The system according to claim 14, wherein the coordination message is a multimedia coordination message including a graphic, image, moving picture or sound.

16. The system according to claim 15, further comprising:
a LMSC/MMSC (Long Message Service Center/Multimedia Message Service Center) for receiving the multimedia coordination message from the message converting center, recording the multimedia coordination message to a SUBMIT message (SMS submit message), and sending the SUBMIT message to the DS-SMSC.

17. The system according to claim 16, wherein the message converting center includes:
a MCS for decorating the SMS into the multimedia coordination message, and sending the decorated coordination message to the LMSC/MMSC; and
a VAS for sending the SMS to the MCS in case the coordination service is activated in the message received from the DS-SMSC.

18. The system according to claim 14, wherein the coordination message is a SMS including a text or emoticon.

19. The system according to claim 18, wherein the message converting center includes:
a MCS for decorating the SMS into the coordination message; and
a VAS for sending the SMS to the MCS, in case the coordination service is activated in the message received from the DS-SMSC.

20. The system according to claim 14, wherein the DS-SMSC checks the location information of the receiving terminal using the DS-HLR, and sends the coordination message to the MSC/SGSN where the receiving terminal is located.

21. A method for decorating a SMS sent from a sending WCDMA subscriber terminal (hereinafter, referred to as a sending terminal) to a receiving WCDMA subscriber terminal (hereinafter, referred to as a receiving terminal), the method comprising:
(a) receiving SMS service profile information of the corresponding sending subscriber having attribute information and subscription information related to a message coordination service for decorating a SMS from a DS-HLR when a location of the sending terminal is registered, and storing and managing the SMS service profile information in a MSC/SGSN where the sending terminal is located;
(b) the sending subscriber making a SMS using the sending terminal, and sending the SMS to the MSC/SGSN where the sending terminal is located via a RTS;
(c) determining based on the SMS service profile information of the sending subscriber whether the corresponding sending subscriber is subscribed to the message coordination service;
(d) recording the SMS service profile information to a Forward_SM message and sending the Forward_SM message to a DS-SMSC, in case the sending subscriber is subscribed to the message coordination service;
(e) recording the SMS in a DELIVER message and sending the DELIVER message to a message converting center, in case the message coordination service is activated in, the SMS service profile information;
(f) decorating the SMS into a coordination message based on a format previously registered by the sending subscriber; and
(g) sending the decorated coordination message to the receiving terminal via the DS-SMSC.

22. The method according to claim 21, wherein the coordination message is a MMS including a graphic, image, moving picture or sound.

23. The method according to claim 22, wherein the step (g) includes:
sending the coordination message to a LMSC/MMSC;
sending the coordination message to the DS-SMSC using a SUBMIT message;
obtaining location information of the receiving terminal from a DS-HLR;
storing the coordination message to a Bearer Data and sending the Bearer Data to a MSC/SGSN where the receiving terminal is located, in a Forward$_{13}$ SM format; and
sending the coordination message to the receiving terminal via the RTS.

24. The method according to claim 21, wherein the coordination message is a SMS including a text or emoticon.

25. The method according to claim 24, wherein the step (g) includes:
sending the coordination message to the DS-SMSC using a SUBMIT message;
obtaining location information of the receiving terminal from a DS-HLR;
storing the coordination message to a Bearer Data and sending the Bearer Data to a MSC/SGSN where the receiving terminal is located, in a Forward_SM format; and
sending the coordination message to the receiving terminal via a RTS.

26. The method according to claim 23 or 25,
wherein the coordination message is sent to the receiving terminal through a line network or a packet network.

27. The method according to claim 23 or 25,
wherein the SMS service profile is recorded in a SMS indicator when being sent.

\* \* \* \* \*